United States Patent [19]

Nilan et al.

[11] 4,126,036

[45] Nov. 21, 1978

[54] SURFACE ROUGHNESS ANALYZER

[75] Inventors: Thomas G. Nilan, Penn Hills Township Allegheny County; Ralph G. Rudolph, Edgewood Borough, both of Pa.

[73] Assignee: United States Steel Corporation, Pittsburgh, Pa.

[21] Appl. No.: 819,530

[22] Filed: Jul. 27, 1977

[51] Int. Cl.² ............................................. G01B 5/28
[52] U.S. Cl. .................................................... 73/105
[58] Field of Search ........................................... 73/105

[56] References Cited

U.S. PATENT DOCUMENTS

| 2,460,726 | 2/1949 | Arndt | 73/105 |
| 3,123,999 | 3/1964 | Judd | 73/105 |
| 3,313,149 | 4/1967 | Spragg | 73/105 |
| 3,529,240 | 9/1970 | Sanders | 73/105 |
| 3,544,774 | 12/1970 | Pekleaik | 73/105 |
| 3,580,062 | 5/1971 | Perthen et al. | 73/105 |

*Primary Examiner*—Anthony V. Ciarlante
*Attorney, Agent, or Firm*—Rea C. Helm

[57] ABSTRACT

A surface roughness analyzer uses a varying electrical output of a transducer attached to a stylus scanning a surface to provide a pulse train having a pulse duration representative of the peak support width established when the output crosses a reference level. During a scan an average arithmetic average roughness is indicated and the pulses are counted which occur within selected ranges of peak support width. Readouts at the end of the scan include average arithmetic average surface roughness, bearing area and peak count with reference levels based on roughness range or bearing area.

18 Claims, 4 Drawing Figures

SURFACE ROUGHNESS ANALYZER

SUMMARY OF THE INVENTION

This invention relates to a method and apparatus for the analysis of surface roughness.

The final surface finish of a cold rolled steel sheet is usually imparted to the sheet by specially prepared textured temper rolls in the final rolling operation. Roll surfaces may be prepared by shot blasting. Roll surfaces may also be prepared by electro-discharge machining, as taught in Bills et al U.S. Pat. No. 3,619,881. The latter method provides a heretofore unavailable degree of control over roll surface preparation both in the degree of roughness and in a reproducible manner. Knowledge of the sheet steel surface characteristics is important in determining its propensity for galling and dimpling during press forming and its acceptance of thin paint systems. Conventional measurements of average surface roughness, bearing area and peak count are often not capable of providing quantitative determinations of the topographical distinctions between surfaces.

The surface analysis equipment we are aware of are generally based on a specific design principle and use test parameters in a particular manner. Because the manner of operation, design principles and test parameters are not uniform, test results on what are identified as having been determined by the same test parameter will often vary among different equipments. More than one test equipment is frequently required for test determinations involving more than a single test parameter. Filtering for waviness and thickness variations have been inadequate as to predictability, particularly on thin materials for draw press forming.

In accordance with our invention a surface roughness analyzer provides dynamic or real time readouts of surface roughness average surface roughness, bearing area, peak count and a new parameter of peak support width distribution above a selectable reference level all of which are obtained in a single surface scan. The reference level may be based on a desired bearing area or based on a percentage of the range of the instrument indicating roughness or the range of the signal indicating roughness.

DETAILED DESCRIPTION

Figure 1:
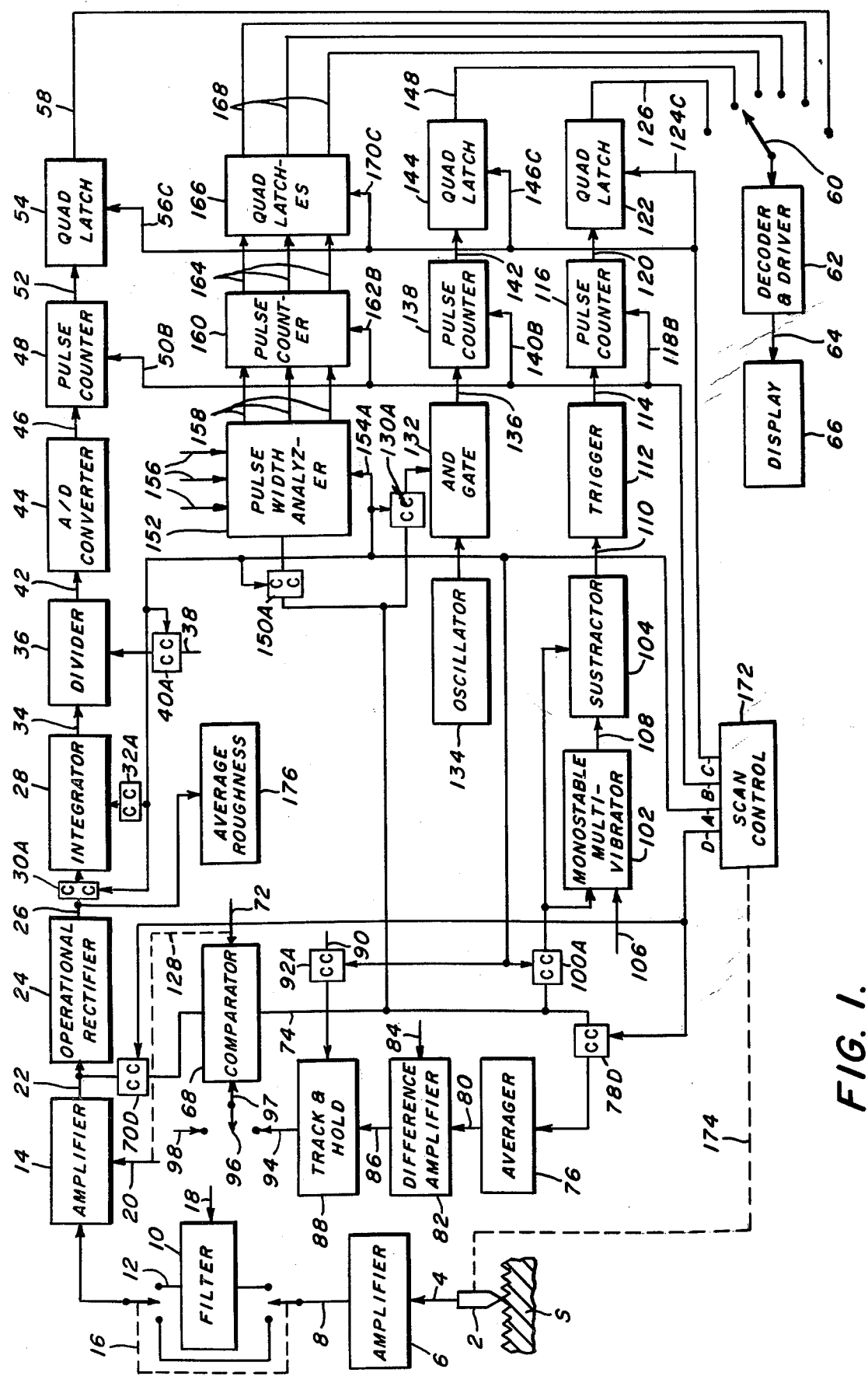
FIG. 1 is a block diagram of the preferred embodiment of our invention.

Referring now to FIG. 1, reference numeral 2 is a transducer having a stylus in contact with the surface of a sample S. The stylus is scanned linearly across the surface S to determine its surface characteristics. Transducer 2 is preferably a displacement sensitive transducer. Transducer 2 has an output 4 connected to an input of a surge protected buffer amplifier 6. Amplifier 6 has an output 8 connected to an input of an active filter circuit 10. Filter circuit 10 has an output 12 connected to the input of a variable gain amplifier 14. A filter bypass 16 switch provides an alternative direct connection between output 8 and the input of amplifier 14. Filter circuit 10 is a standard design 3-pole active high-pass filter of the Butterworth Type with selectable minimum pass frequencies determined by the setting of a selector switch 18. Amplifier 14 has a gain adjustor 20 which includes discrete gain multiples so that the range of the output of amplifier 14 will correspond to the range of stylus displacement.

Figure 2:
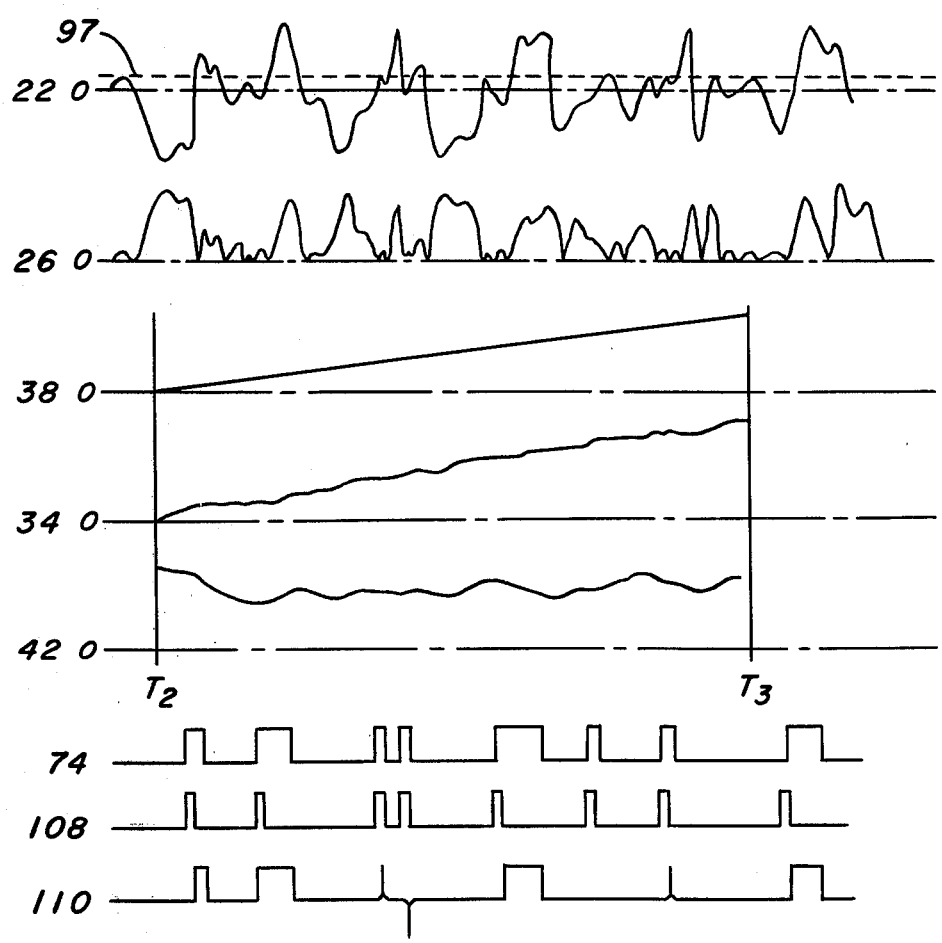
FIG. 2 depicts waveforms at various points of FIG. 1.

Amplifier 14 has an output 22 which is identical to output 4, but is changed in amplitude according to the gain adjustor setting, connected to an input of an operational rectifier 24, in a circuit for providing an indicating of arithmetic average surface roughness. Rectifier 24 passes the positive going portions of output 22 as shown in FIG. 2 and inverts the negative going portions to provide an output 26, a direct current signal which is proportional to the arithmetic average surface roughness. Output 26 is connected to the input of an integrator 28 through control contacts 30A. Integrator 28 has a control input through control contacts 32A and an output 34 connected to an input of a divider circuit 36. Divider 36 has a reference input 38, a voltage proportional to the scan time connected through control contacts 40A. Circuit 36 divides integrator output 26 by reference voltage 38 to provide an output 42 directly proportional to the average arithmetic average of surface roughness per unit scan time. Output 42 is connected to an input of an analog to digital converter 44 which converts the voltage level of output 42 of divider circuit 36 to a pulse output 46. Output 46 is connected to an input of a pulse counter 48. Pulse counter 48 has a reset input 50B and an output 52 connected to an input of a quad latch 54. Quad latch 54 has a hold input 56C and an output 58 connected to a selector switch 60. Selector switch 60 is connected to a decoder and driver circuit 62. Circuit 62 has an output 64 connected to an input of a display unit 66.

Output 22 is also connected to an input of a comparator 68 through control contacts 70D. Comparator 68 has an input 72 for providing a variable amount of hysteresis or dead-band and an output 74 connected to an input of an averager circuit 76 through control contacts 78D. Circuit 76 has an output 80 connected to an input of an amplifier 82. Amplifier 82 has a bearing area reference input 84 and an output 86 connected to an input of a track and hold circuit 88. Circuit 88 has a control input 90 connected through control contacts 92A and an output 94 connected to a reference input 97 of comparator 68 through a switch 96. A percent instrument range reference 98 is also connected to the reference input of comparator 68 through switch 96.

Output 74 is also connected to a peak counting circuit through control contacts 100A to an input of a monostable multivibrator 102 and an input of a subtractor circuit 104. Monostable multivibrator 102 has a reference input 106 and an output 108 connected to a second input of subtractor 104. Circuit 104 has an output 110 connected to an input of a trigger circuit 112. Circuit 112 has an output 114 connected to an input of pulse counter 116. Pulse counter 116 has a reset input 118B and an output 120 connected to the input of a squad latch 122. Quad latch 122 has a hold input 124C and an output 126 connected to switch 60.

A mechanical coupling 128 connects the control for gain adjustor 20 to the control for input 72.

Output 74 is also connected to a bearing area circuit through control contacts 130A to an input of an AND gate 132. An oscillator 134 is connected to a second input of gate 132. Gate 132 has an output 136 connected to an input of a pulse counter 138. Counter 138 has a reset input 140B and an output 142 connected to an input of a quad latch 144. Quad latch 144 has a hold input 146C and an output 148 connected to switch 60.

Output 74 is also connected to a peak support width distribution circuit through control contacts 150A to a pulse width analyzer circuit 152 of the type described in copending Rudolph Application Ser. No. 819,531 filed July 27, 1977 and entitled, "Duration Range Determination of Incursions by a Variable Signal". Any other circuit providing the same type of outputs could also be used. Circuit 152 has a control input 154A, a plurality of reference inputs 156, three are shown, and a plurality of outputs 158, three are shown corresponding to the number of inputs 156. Outputs 158 are connected to inputs of a plurality of pulse counters 160 having a reset input 162B and a plurality of outputs 164 connected to inputs of a plurality of quad latches 166. Quad latches 166 have a plurality of outputs 168 connected to switch 60 and a hold input 170C.

A scan control unit 172 has output lines A, B, C and D and has a mechanical coupling 174 to stylus 2. Unit 172 may be any type of timer capable of providing signals A, B, C and D in sequences shown in FIG. 3 at desired scan speed when initiated by a scanner. An average surface roughness meter 176 is connected to indicate output 26.

For operation, frequency selector switch 18 is set to the desired filter cut-off frequency. The cut-off frequency should be the frequency most suitable for eliminating waviness and thickness variations from the transducer output signal for the surface being analyzed. Amplifier 14 should have the gain adjustor 20 set to correspond to a roughness range higher than the actual surface roughness to be measured to avoid overloading the amplifier. For example, if the arithmetic average surface roughness is 100 microinches, a gain setting of 500 microinches may be used. Reference voltage 38 is set to provide a voltage proportional to the scan time. Reference input 106 of monostable multivibrator 102 is set to provide output 108 with a pulse length the same as the shortest pulse length desired to count. Reference inputs 156 are set to provide the desired ranges of pulse width for each output 158 of circuit 152. Input 72 of comparator 68 is set to provide a desired amount of insensitivity to minor level-crossing excursions of input 22. This setting may be provided by mechanical coupling 128 when it is desired to make the hysteresis setting dependent upon the gain. Meter 176 should have a range sufficient to include the magnitude of output 26 and adequate damping characteristics to provide an averaging of output 26.

Figure 3:
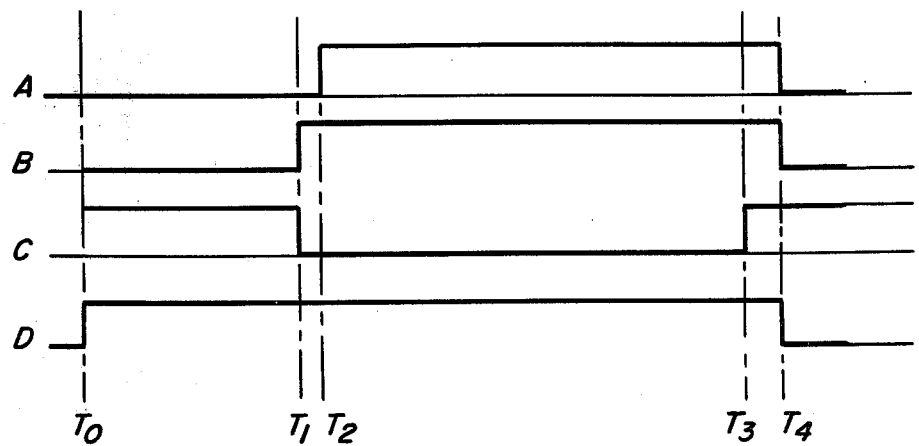
FIG. 3 is a timing diagram of the scan control unit outputs.

In operation, the stylus of transducer 2 is moved across the surface of the test piece S by any conventional scanning mechanism having a constant scanning speed. Meter 176 provides an output, a real time arithmetic average surface roughness, during the scan and presents a rough and quick detection of unusual surface abnormalities which may affect the other test results. At the beginning of a scan, the coupling 174 actuates scan control unit 172 to provide control output D closing contacts 70D and 78D. At the same time, outputs A and B are set so that all control contacts are open and output C is set to place the quad latches 54, 122, 144 and 166 in a hold mode. Closing of contacts 70D and 78D is time $T_o$ as shown in FIG. 3. As scanning begins, the signal from transducer 2 is amplified and filtered to provide output 22, a varying electrical signal representative of the surface profile as shown in FIG. 2. Comparator 68 provides output 74, a pulse train which has pulse edges for each time signal 22 crosses the reference level 97 and in which each pulse has a duration or width representative of the base or the peak support width, at the reference level, of the surface peaks. The reference level input 97 for comparator 68 is selected as a percent of bearing area.

Assuming a 20% bearing area is the desired reference level, reference input 84 is set to a voltage equal to a voltage corresponding to a 20% bearing area. During the initial part of the scan averager circuit 76 produces an output 80 which is proportional to bearing area measured. Amplifier 82 amplifies the difference between the actual bearing area and the desired bearing area to provide output 86 which passes unchanged through track and hold circuit 88, and the lower position of switch 96 to become reference input 97. The polarity and magnitude of output 86 is such that the measured bearing area 80 and the reference bearing area 84 are quickly forced to be equal. After a suitable time delay to allow stabilization of the circuitry, for example 5 seconds, at time $T_1$, controller 172 changes output C to enable the quad latches 54, 122, 144 and 166 to follow the inputs to the quad latches, and changes output B to enable counters 48, 138, 116 and 160 to count pulses. A small fraction of a second later at time $T_2$, the start of the recording time, output A changes to close control contacts 30A, 32A, 40A, 92A, 100A, 130A, 150A and 154A.

The closing of contacts 32A allows integrator 28 to integrate and the closing of contacts 30A connects integrator 28 to output 26, a full wave rectification of signal 22. The closing of contacts 40A connects reference voltage 38, a voltage proportional to the scan time from $T_2$ to $T_3$ to be connected to divider circuit 36. The analog output of divider circuit 36 is converted to digital form in converter 44, counted by counter 48, and stored in quad latch 54, the total is a digital representation of the average arithmetic average of surface roughness.

The closing of contacts 92A places circuit 88 in a hold mode fixing output 86 so that the 20% bearing area level of reference 84 is fixed for the scan recording period.

The closing of contacts 100A connects output 74 to monostable multivibrator 102 and subtractor circuit 104. On each positive going pulse of output 74, monostable multivibrator 102 provides a positive pulse 108, FIG. 2, of fixed duration, the minimum length which is desired to count. Output 108 is subtracted from output 74 in subtractor 104 providing a positive pulse output 110 only if the pulse length of the pulse in output 74 exceeds the pulse length of output 108. Trigger circuit 112 passes only positive pulses to counter 116 where the pulses are counted in counter 116 and stored in quad latch 122, the total is a digital representation of the number of peaks above a certain width at the 20% bearing area reference.

The closing of contacts 130A connects output 74 to gate 132 which produces output 136 only where both its inputs are positive. Oscillator 134 may be typically set to provide 10,000 positive going pulses during the scan recording period so that the number of pulses counted in counter 138 and stored in quad latch 144 will be a direct digital representation of the bearing area. For greater accuracy more than 10,000 pulses pre scan could be used.

The closing of contacts 150A and 154A connects output 74 to circuit 152 and turns on circuit 152. Whenever the duration of a pulse of output 74 falls within one of the selected pulse width ranges of reference inputs 156, an output pulse is provided from the appropriate output 158. The output pulses are counted in counters 160 and stored in quad latches 166, the totals are counts of the number of peaks within each peak support width range.

At time $T_3$, the end of the desired scan recording time, output C is switched to place quad latches 54, 122, 144 and 166 in the hold mode to store the counter-outputs. A short time later, at time $T_4$, outputs A, B and D are changed to an "off" position preparing the analyzer for the next scan. The stored outputs in quad latches 54, 122, 144 and 166 may now be selectively inputed to circuit 62 by the position of switch 60, and the outputs displayed in any convenient form by display unit 66.

If it is desired to determine bearing area and peak support width distribution on reference level 97 based on another parameter, such as a selected percent of the average roughness range expressed as an instrument range or a signal range, switch 96 is placed in its upper position connecting roughness reference level voltage 98 to comparator 68 to provide output 74 based on percent roughness level range.

Divider circuit 36 may be omitted when the time between $T_2$ and $T_3$ is fixed for a fixed scan length.

Figure 4:
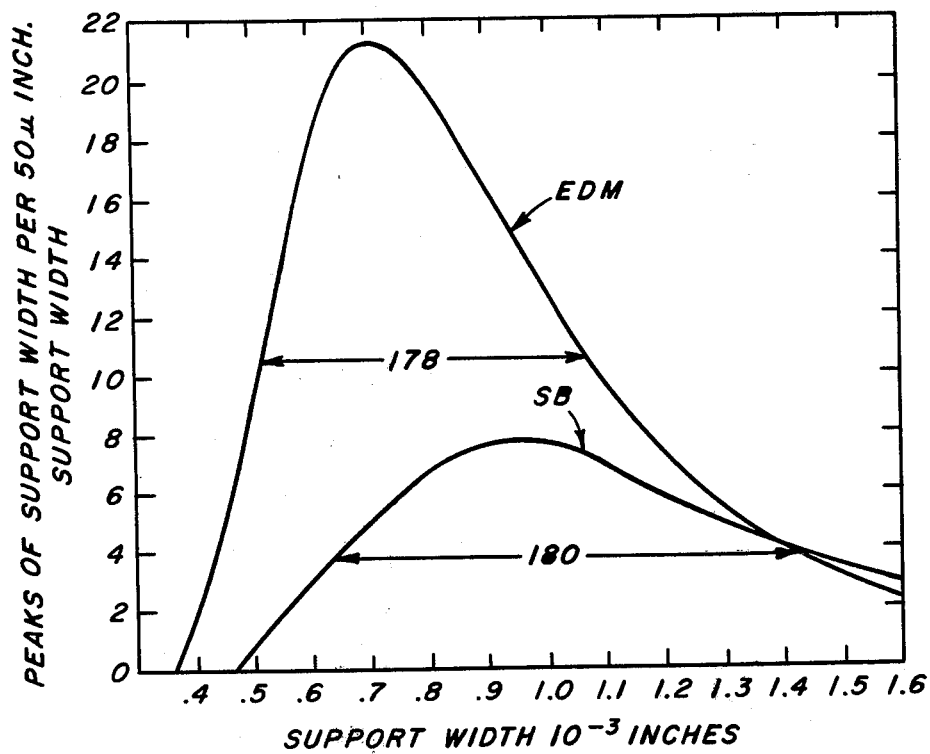
FIG. 4 is a graphical illustration of the use of our invention in determining surface characteristics.

FIG. 4 shows how the analyzer of our invention may be used in determining the quantitative differences between surfaces that otherwise appear to be the same. The surfaces of two samples of cold rolled steel, one finished by shot-blast machined, SB, rolls and the other finished by electro-discharge machined, EDM, rolls were analyzed. The results were generally indistinguishable as to peak count and average surface roughness, but the differences between the two surfaces are clearly shown when the peak support width distribution is considered. The width of the distribution curve at half maximum, 178 for the EDM sheet and 180 for the SB sheet, is one example of a measure of the peak width distribution of the surfaces. Analysis of standard deviations in peak support width distribution provides additional indication of surface characteristics.

While it is desirable to eliminate minor level-crossing excursions of input 22 by setting input 72 at a selectable hysteresis level, if the level is not set according to gain setting 20, peak count, peak width distribution and bearing area measurements will not be repeatable as gain is varied. Hysteresis may be reset manually for each change in gain, but it is preferable to mechanically couple the gain control to the hysteresis control so that tests results will be reproducible over the gain range, and so that the test results will be on a uniform basis throughout the gain range.

The bearing area reference level is preferred because of the high correlation between the drawability of sheet steel and the surface characteristic measuring parameters based on bearing area reference level. We have found that bearing area levels of 10 to 50 percent are satisfactory and a level of 20% provides the best correlation.

The three-pole active filter design provides better rejection of waviness and thickness variations than passive filters or one or two-pole active filters, although such latter filters may be adequate with respect to some material characteristics.

The surface roughness analyzer of our invention thus provides an arithmetic average surface roughness during scan, an average of the arithmetic average surface roughness, a peak support width distribution, a bearing area and a peak count together with the capability of selecting reference levels based on either bearing area or average surface roughness range, a range of parameters that can adequately measure surface conditions to determine suitability of a surface for its intended uses. Improved filtering removes waviness and thickness variations from surface roughness determinations.

We claim:

1. A surface roughness analyzer in which a stylus connected to a transducer is moved across a surface providing a varying electrical signal representative of the surface profile and establishing peak support widths at a selected reference level as the signal level crosses the reference level comprising
    means connected to the transducer for providing a pulse train in which the duration of each pulse is representative of a peak support width established by the electrical signal crossing the reference level,
    means connected to the means for providing a pulse train for determining whether the duration of each pulse occurs within one of a selected plurality of ranges, and
    means connected to the means for determining pulse duration occurrence within a range for counting the number of occurrences in each range.

2. An analyzer according to claim 1 in which the reference level is an electrical signal representative of a percentage of the bearing area of the surface being analyzed.

3. An analyzer according to claim 2 in which the stylus is moved across the surface a first distance for establishing the reference level and a second distance for analyzing and in which the means for providing a pulse train includes
    a comparator for comparing the varying electrical signal to the reference level,
    a reference level input to the comparator, and
    circuit means connected to the reference level input for establishing the reference at a level representative of a desired percentage of the bearing area during stylus movement the first distance and holding said level during stylus movement the second distance.

4. An analyzer according to claim 3 which includes a three pole high pass active filter connected between the comparator and the transducer.

5. An analyzer according to claim 4 which includes means connected to the transducer for providing an output, at the same time as stylus movement, representative of the arithmetic average surface roughness.

6. An analyzer according to claim 5 which includes means for adjusting the sensitivity of the comparator to a desired level of excursions of the varying electrical signal.

7. An analyzer according to claim 6 which includes
    an amplifier connected between the transducer and the comparator,
    means for adjusting the gain of the amplifier, and
    means connected to the amplifier and the comparator for adjusting the sensitivity of the comparator as the amplifier gain is adjusted.

8. An analyzer according to claim 7 which includes
    means connected to the transducer for providing an output representative of the average arithmetic average surface roughness.

means connected to the means for providing a pulse train for providing an output representative of bearing area, and means connected to the means for providing a pulse train for providing an output representative of the number of peaks of said electrical signal above the reference level.

9. An analyzer according to claim 8 in which the means for providing an output representative of the number of peaks includes means for limiting said output to a selected peak support width level.

10. An analyzer according to claim 1 in which the reference level is an electrical signal representative of a percentage of the range of the varying electrical signal.

11. An analyzer according to claim 10 in which the means for providing a pulse train includes
a comparator for comparing the varying electrical signal to the reference level and a reference level input to the comparator.

12. An analyzer according to claim 11 which includes a three-pole high pass active filter connected between the comparator and the transducer.

13. An analyzer according to claim 12 which includes means connected to the transducer for providing an output, at the same time as stylus movement, representative of the arithmetic average surface roughness.

14. An analyzer according to claim 13 which includes means for adjusting the sensitivity of the comparator to a desired level of excursions of the varying electrical signal.

15. An analyzer according to claim 14 which includes
an amplifier connected between the transducer and the comparator,
means for adjusting the gain of the amplifier, and
means connected to the amplifier and the comparator for adjusting the sensitivity of the comparator as the amplifier gain is adjusted.

16. An analyzer according to claim 15 which includes
means connected to the transducer for providing an output representative of the average arithmetic average surface roughness,
means connected to the means for providing a pulse train for providing an output representative of the number of peaks of said electrical signal above the reference level.

17. An analyzer according to claim 16 in which the means for providing an output representative of the number of peaks includes means for limiting said output to a selected peak support width level.

18. A method of analyzing the roughness of a surface in which a transducer connected to a stylus is moved across the surface generating a varying electrical signal representative of the surface profile comprising the steps of
developing a reference level signal representative of a desired fraction of the surface bearing area during a first movement of the stylus across the surface,
developing a train of electrical pulses with each pulse beginning and ending when the varying electrical signal is equal to the reference level signal during a second movement of the stylus across the surface,
establishing a plurality of ranges for duration of pulses occurring during a movement of the stylus across the surface,
determining the number of pulses occurring in each range during the second movement of the stylus, and
determining the distribution of the number of pulses within the established ranges.

* * * * *